Feb. 7, 1956  S. M. WAAS  2,733,841
LIQUID SEASONING PUMP SYSTEM FOR POPCORN MACHINES
Filed Jan. 15, 1951

INVENTOR.
Samuel M. Waas
BY
ATTORNEY

United States Patent Office 2,733,841
Patented Feb. 7, 1956

2,733,841

LIQUID SEASONING PUMP SYSTEM FOR POPCORN MACHINES

Samuel M. Waas, Kansas City, Mo., assignor to Manley, Inc., Kansas City, Mo., a corporation of Missouri Application January 15, 1951, Serial No. 205,984

1 Claim. (Cl. 222—385)

This invention relates to pumping apparatus for handling fluids and particularly liquids, the primary object being to provide apparatus of such character particularly adaptable for use in popcorn machines to direct measured quantities of seasoning to the popcorn kettle of the machine each time a popping operation takes place.

It is the most important object of the present invention to provide a novel pump assembly that includes a manually operable handle for reciprocating the piston of the pump and retractable on an axis transverse to the axis of rotation of the handle and the path of travel of the piston whereby to permit positioning of the handle out of the way of the popcorn machine operator when the pump is not in use.

Another equally important object of the present invention is to provide measuring means for a pump assembly of the aforementioned type that includes a stop on the piston stem capable of being positioned at various locations thereon to govern the extent of reciprocation of the piston and therefore, the amount of liquid dispensed by the pump.

A still further object of the present invention is to provide an assembly of parts including the aforesaid pump, its actuating means and a reservoir for the seasoning to be pumped, all associated together in a composite unit.

It is a further object of this invention to provide a manually controlled air valve for discharging the fluid line at the end of each operation to prevent congealing of the seasoning therein and, therefore, clogging.

Other objects include details of construction all of which will be made clear or become apparent as the following specification progresses, reference being had to the accompanying drawing, wherein.

Figure 1:
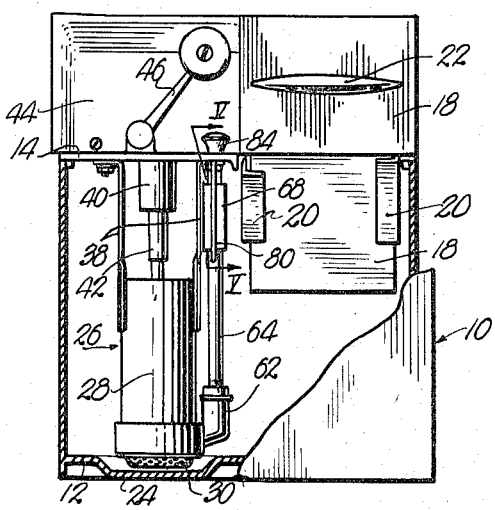
Figure 1 is a front elevational view of a liquid seasoning pump assembly for popcorn machines made according to the present invention, parts being broken away and in section to reveal details of construction.

Popcorn machines employing a popping kettle such as forms the subject matter of my co-pending application Serial No. 205,983 filed on even date herewith and entitled "Kettle Construction for Popcorn Machines" are advantageously provided with means for directing measured quantities of seasoning to the kettle each time a supply of unpopped corn is placed in the kettle. Designers of such popcorn machines are confronted with certain inherent problems including that of keeping the passageways for the fluid open, since the liquid seasoning has a tendency to congeal.

The nature of the liquid seasoning is immaterial to the concepts of the present invention that usually the same includes a vegetable oil such as cottonseed oil and the like.

It is contemplated by the present invention that there be provided a hollow receptacle for such liquid seasoning broadly designated by the numeral 10 in the drawing and adapted for housing within the popcorn machine case much like a drawer. The receptacle 10 includes side and end walls together with a bottom wall 12, within which is integrally molded a heating unit and a control thermostat, both not shown. Through use of such heating element it is possible to maintain the liquid within the receptacle 10 sufficiently fluid to render pumping thereof easy.

Receptacle 10 is also provided with a lid 14 removably secured thereto through the medium of a plurality of bolts and associated wing nuts 16. The entire pump unit of the present invention is carried by the removable lid 14 as is an inclined open top drawer 18 extending through the lid 14. A pair of guides 20 is provided for the drawer 18 depending from the lid 14. Drawer 18 is provided with a handle 22 and is open at its top and lowermost end, whereby as the drawer 18 is pulled outwardly, the operator may pour the liquid thereinto and the same will flow into receptacle 10. The bottom wall 12 of the receptacle 10 is provided with an offset portion 24 so arranged as to receive the liquid in the tank 10 whereby substantially all of such liquid may be pumped therefrom through the medium of a pump assembly broadly designated by the numeral 26. Assembly 26 includes a cylinder 28 open at its ends and having a filtering screen 30 at the lowermost end thereof terminating within the offset portion 24 of bottom wall 12.

A reciprocable piston 32 is provided in the cylinder 28 that in turn has an elongated rod-like stem 34, the uppermost end whereof is preferably polygonal and having a plurality of teeth on one face thereof defining an elongated, longitudinally extending rack 36.

Figure 3:
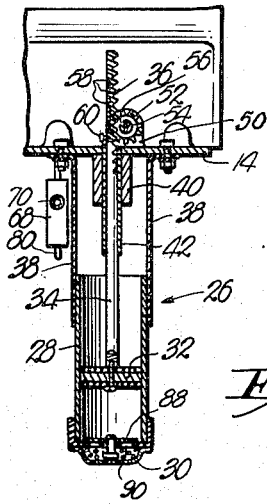
Fig. 3 is a fragmentary, cross-sectional view taken on line III—III of Fig. 2 looking in the direction of the arrows.

The cylinder 28 is supported by the top wall 14 of receptacle 10 through the medium of a pair of depending brackets 38 and a downwardly extending tubular boss 40 on the wall 14 receives a tubular bearing 42 for the stem 34. Obviously, the wall 14 is provided with an opening for receiving the tube 42 and in register with the boss 40 as is clear in Fig. 3 of the drawing.

A dish-shaped wall 44 is provided alongside the drawer for housing an operating handle 46 for the pump assembly 26. Handle 46 is mounted directly on one end of an elongated shaft 48 that is reciprocable on its longitudinal and horizontal axis substantially perpendicular to the reciprocable path of travel of the stem 34.

A pair of spaced-apart bearings 50, one of which extends through the wall 44, is provided on the uppermost face of the wall 14 for the elongated shaft 48 and a pinion 52 on shaft 48 is disposed between the bearings 50 in mesh with the rack 36. Shaft 48 is slidable on its longitudinal axis with respect to the pinion 52 but cannot rotate with respect thereto because of a longitudinal slot 54 in shaft 48 receiving a key 56 forming a part of the pinion 52. The stem 34 has a plurality of tapped openings 58 adjacent the rack 36 and opposed thereto for selectively receiving a setscrew 60, the openings 58 being spaced equally along a portion of the length of stem 34.

The cylinder 28 is provided with an outlet opening registering with a coupling 62 that is in turn connected with an upstanding pipe 64 that passes through the lid 14 and has the connection 66 therein. Connection 66 is joined with a small tubular housing 68 by means of a pipe 70, housing 68 being provided with an ear inlet 72 normally closed by ball valve 74. Valve 74 is held biased toward the closed position by a spring 76 within housing 68 bearing at its uppermost end against a removable plug 78 closing the upper end of housing 68.

Actuating means for the valve 74 includes a Y-shaped rod 80 extending through the opening 72 and projecting upwardly through an opening 82 in lid 14. A finger knob 84 on the upper end of rod 80 is disposed within the housing provided for by wall 44. The upper end of the pipe 64 above lid 14 is connected with a conduit 86 that terminates within the popcorn machine cabinet for directing liquid emanating from receptacle 10 into the popcorn kettle not shown.

Figure 2:
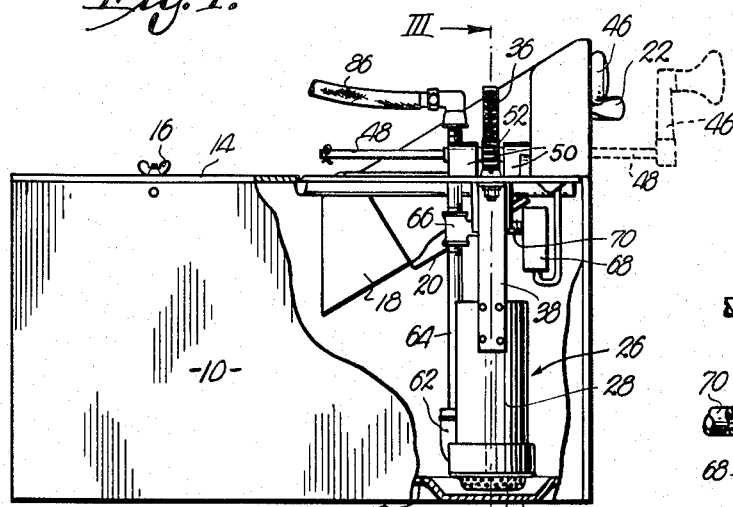
Fig. 2 is a side elevational view thereof, parts being broken away for clearness.
Figure 5:
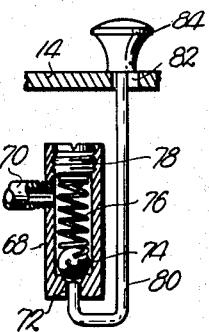
Fig. 5 is an enlarged, detailed, cross-sectional view taken on line V—V of Fig. 1.
Figure 4:
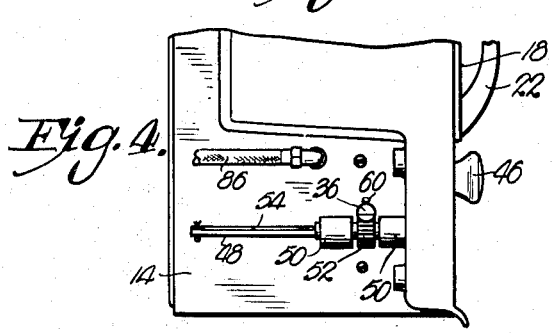
Fig. 4 is a fragmentary, top plan view.

In use, the entire unit including the receptacle 10 and all of its associated parts is placed within a suitable receiving compartment forming a part of the popcorn machine where it remains until it is desired to remove the lid 14 and clean the receptacle 10. Filling of the receptacle 10 may be accomplished through pulling of drawer 18 outwardly as above indicated, the drawer 18 thereby serving as a funnel. The handle 46 is normally disposed substantially entirely within the housing presented by wall 14. When it is desired to direct a quantity of liquid from the receptacle 10 into the popping kettle the operator merely pulls handle 46 outwardly to the dotted line position illustrated in Fig. 2 where handle 46 may be turned to rotate shaft 48. It is seen that shaft 48 sliding within pinion 52 may be moved as desired to render the handle 46 rotatable. Because of the slot 54 and the keys 56, rotation of shaft 48 will in turn rotate the pinion 52 and since the latter is in mesh with the rack 36, stem 34 and its piston 32 will be reciprocated on a vertical axis with respect to the cylinder 28. As piston 32 moves upwardly, liquid will be drawn into the cylinder 28 through screen 30 whereupon rotation of the handle 46 in the opposite direction to move the piston 32 downwardly, will force the liquid into the pipe 64.

A small flapper valve 88 moves to a position closing an inlet opening 90 forming a part of the cylinder 28 when the piston 32 moves downwardly. Liquid flowing outwardly through the coupling 62 and the pipe 64 will be directed to the popping kettle by way of the conduit 86. When piston 32 reaches the lowermost end of its path of travel as determined by the stop 60, striking the upper face of lid 14, the liquid within the tube 86 and pipe 64 can be drained therefrom back into the receptacle 10 by pulling knob 84 upwardly and thereby opening valve 74. Such action permits air to enter opening 72 and pass into the housing 68 and pipe 70 as well as the entire line 64—86. It is contemplated that the openings 58 be graduated in ounces and therefore, by repositioning the stop 60 as desired a predetermined number of ounces of seasoning may be directed to the popping kettle for each operation of handle 46. Upward movement of piston 32 is determined by the rack 36. In other words, as the lowermost end of the rack 36 comes into contact with the pinion 52, further upward movement of piston 32 is prevented.

As a further means of preventing congealing of the liquid seasoning within the conduit 86, the latter may be wrapped with a heating element not shown and controlled by an instrument panel forming a part of the popcorn machine.

It is apparent from the foregoing that liquid seasoning may be directed to a popping kettle for popcorn machines easily and expeditiously through use of the assembly above described.

Further, the entire unit is easy to maintain and keep in a clean condition and is inexpensive to manufacture. Details of construction may vary within the spirit of the invention and it is, therefore, desired to be limited only by the scope of the appended claim.

Having thus described the invention what is claimed as new and desired to be secured by Letters Patent is:

In fluid handling apparatus, a fluid tank having a lid; releasable means mounting the lid on the tank; a pump including a cylinder mounted on the lid within the tank in depending relationship to the lid, said pump being provided with an inlet, an outlet tube extending beyond the tank, and a piston reciprocably mounted in the cylinder and provided with a vertical stem extending upwardly through said lid, there being teeth formed on the stem presenting a rack; a pair of spaced bearings mounted upon the lid; a pinion between the bearings above the lid and in mesh with the rack; an elongated, horizontal shaft extending through the pinion and the bearings for reciprocation relative to both the pinion and the bearings on the longitudinal axis of the shaft, said shaft having a longitudinal slot extending substantially the full length thereof and being rotatable in the bearings; a key secured to the pinion and extending into the slot; a handle rigidly mounted on one end of the shaft for rotating the shaft and pinion to reciprocate the stem and piston, said bearings being adjacent the pinion for holding the same in mesh with the rack during reciprocation of the shaft; and a dish-shaped wall on the lid for housing said handle when the shaft is shifted in the pinion to one end of its reciprocable path of travel, said wall being provided with means clearing the shaft for reciprocation and rotation.

References Cited in the file of this patent

UNITED STATES PATENTS

| | | |
|---|---|---|
| 135,680 | Wilder | Feb. 11, 1873 |
| 816,305 | Dunn | Mar. 27, 1906 |
| 850,991 | Abbott | Apr. 23, 1907 |
| 1,081,817 | Deming | Dec. 16, 1913 |
| 1,225,124 | Gehman et al. | May 8, 1917 |
| 1,289,752 | Hawkins | Dec. 31, 1918 |
| 1,342,262 | Georgenson | June 1, 1920 |
| 1,498,364 | Eilers et al. | June 17, 1924 |
| 1,846,135 | Mickelson | Feb. 23, 1932 |
| 1,874,612 | Peterson | Aug. 30, 1932 |
| 2,169,514 | Buzzard et al. | Aug. 15, 1939 |
| 2,393,813 | Roggan | Jan. 29, 1946 |
| 2,554,802 | Waas | May 29, 1951 |